United States Patent [19]

Scheider et al.

[11] Patent Number: 4,945,687

[45] Date of Patent: Aug. 7, 1990

[54] ROTARY FININSHING TOOL

[75] Inventors: Alfred F. Scheider, Orange; R. Brown Warner, Westlake, both of Ohio

[73] Assignee: Jason, Inc., Cleveland, Ohio

[21] Appl. No.: 384,759

[22] Filed: Jul. 25, 1989

[51] Int. Cl.$^5$ .............................. B24D 11/00
[52] U.S. Cl. ........................ 51/394; 51/400; 51/401; 51/206 NF; 51/298
[58] Field of Search ............... 51/334, 394, 400, 401, 51/206 NF, 206 R, 207, 209 R, 298, 307, 308, 309

[56] References Cited

U.S. PATENT DOCUMENTS

| | | | |
|---|---|---|---|
| 2,496,352 | 2/1950 | Metza et al. | 51/209 R |
| 3,773,480 | 11/1973 | Hall et al. | 51/298 |
| 4,809,467 | 3/1989 | Defazio | 51/206 NF |

Primary Examiner—Frederick R. Schmidt
Assistant Examiner—M. Rachuba
Attorney, Agent, or Firm—Renner, Otto, Boisselle and Sklar

[57] ABSTRACT

A rotary finishing tool, comprising (a) a foamed elastomeric bond where the elastomeric bond has greater than 5% void and contains (i) a medium abrasive grit having a grain size of from about 30 to about 50, and (ii) a fine abrasive grit having a grain size about 70 to about 100. In another embodiment, a rotary finishing tool, comprising (a) a hub adaptable to be power driven, (b) an array of abrasive monofilaments secured to and projecting from the hub, where the abrasive monofilament is a polymeric material which has abrasive grit dispersed throughout, (c) and abrasive grit containing foamed, elastomeric bond, having greater than 5% voids, secured to the hub and encapsulating the array of monofilaments.

12 Claims, 1 Drawing Sheet

ROTARY FINISHING TOOL

FIELD OF THE INVENTION

This invention relates generally to a rotary finishing tool.

BACKGROUND OF THE INVENTION

A wide variety of commercial equipment is available for use in abrading and polishing surfaces, stock removal and the like. The equipment and tools therefor exist in various forms (e.g., rotary, continuous belt, reciprocating, etc.). The rotary devices generally employ wheels or disks of two types, coated or bonded. A coated abrasive is one which the particles of either abrasive or polishing media are present in a thin coating on the surface of a body material which may be paper, cloth, netting, or the like, and are bonded to such body material by a suitable adhesive or binder vehicle. A bonded abrasive is one in which the abrasive is dispersed throughout the bonding vehicle which is preformed into various solid shapes and cured or otherwise solidified for use in solid form. The bonding vehicles used are often polymeric materials. These polymeric materials may be foamed. Some work has been done with "foamed" abrasives in an effort to obtain some degree of yieldability. These efforts have been almost entirely limited to scouring pads, or similar hand-held devices of limited usefulness (note British Patent No. 716,422). This is because the foam matrix by its very nature is inherently weak as a body material, and is incapable of withstanding the internal forces in use which tend to distort and disintegrate the foamed structure. This is particularly true in the case of wheels employed in high speed rotary operations which may result in ballooning of the wheels or disruptive forces which otherwise render the wheels ineffective for some uses, particularly uses involving high speed stock removal.

Some further attempts have been made to overcome the above difficulties by densifying the foam (note U.S. Pat. No. 2,885,276) but these efforts have been found to intensity the internal destructive potential in rotary operations, or to produce a wheel so densified so as to be subject to the same difficulties encountered with "bonded" abrasive wheels (i.e., "clogging", "smearing", "chattering", or utility limited to abrading of "high spots", etc.).

Accordingly there is a need for a rotary finishing or abrading tool which has a foamed elastomeric bond of relatively low tensile strength that has a cellular structure which provides improved cutting action and material removal versus tool life, while also providing shapeability, shape containment, and non-loading or smearing, and non-chatter characteristics.

SUMMARY OF THE INVENTION

The invention provides a rotary finishing tool, comprising (a) a foamed elastomeric bond where the elastomeric bond has greater than 5% voids and contains (i) a medium abrasive grit having a grain size of from about 30 to about 50, and (ii) a fine abrasive grit having a grain size of about 70 to about 100.

In another embodiment, the invention provides a rotary finishing tool, comprising (a) a hub adaptable to be power driven, (b) an array of abrasive monofilaments secured to and projecting from the hub, where the abrasive monofilament is a polymeric material which has abrasive grit dispersed homogeneously throughout, and (c) an abrasive grit containing foamed, elastomeric bond, having greater than 5% voids, secured to the hub and encapsulating the array of monofilaments.

The rotary finishing tools of the present invention allow for improved safe speed because of reduced inertia over bonded brushes with metal bristles. Further, the tools provide a beneficial non-load/non-chatter characteristic. The voids present in the elastomeric bonds provide for increased flexibility, provide chip clearance and prevent loading problems.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
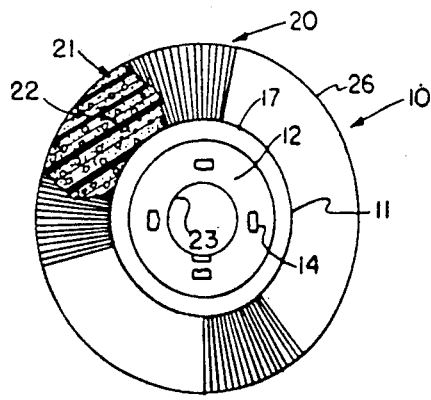
FIG. 1 is an axial end elevation of a wheel type tool in accordance with the present invention.
Figure 2:
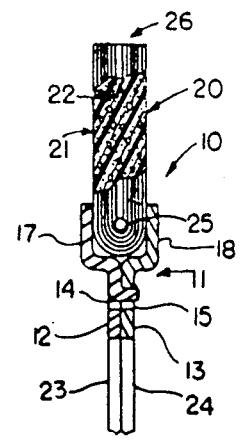
FIG. 2 is an enlarged fragmentary quarter section of the tool of FIG. 1.

Referring initially to FIGS. 1 and 2 there is illustrated a rotary finishing tool 10 in accordance with the present invention. The tool includes an annular hub 11 formed of annular plates 12 and 13 which are joined or clinched together by tabs 14 projecting from one plate through holes 15 in the other plate. At the outer end of each plate there is provided an annular shoulder as seen at 17 and 18 which forms a radially outwardly opening channel in which the tool monofilaments are positioned as seen at 20. The plates are provided with aligned central holes 22 and 23 through which may extend a spindle or arbor of a power driven tool or machine. The rotary tool may be clamped onto or keyed to such arbor or spindle for power driven rotation.

The monofilaments 20 are bent around an annular retaining ring or wire shown at 25 and encapsulated in a foamed elastomeric bond 21 which has abrasive grit 22 evenly distributed throughout. The monofilaments are evenly distributed to form an annular array and along with the foamed elastomeric bond form the annular tool face 26.

The rotary finishing tools of the type shown in FIGS. 1 and 2 are as indicated circular in shape and may range from approximately one inch diameter to 16 inches or more in diameter and have face widths from as little as ⅛ inch to 2¼ inches.

Figure 3:
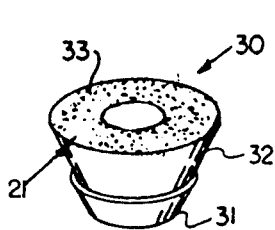
FIG. 3 is a perspective view of a cup-shape tool in accordance with the present invention.

In FIG. 3 there is illustrated a cup-shape tool 30 which again includes a metallic hub 31 which may be mounted on a rotary arbor or spindle. The array of monofilaments and foamed elastomeric bond seen at 32 project from the hub in a flaring fashion. The ends of the monofilaments and foamed elastomeric bond as seen at 33 form a tool face. Such cup-shape tools may range from approximately 2 to about 8 inches in diameter and are principally designed for use on portable tools.

Figure 4:
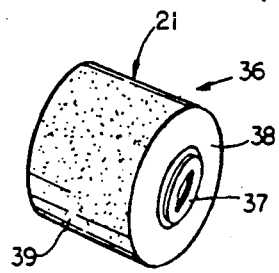
FIG. 4 is a similar view of a wide face cylindrical tool.

FIG. 4 illustrates a wide face cylindrical brush or tool 36 which again includes a metallic hub 37 designed to be mounted on an arbor or shaft. The annular array of monofilaments 38 and foamed elastomeric bond 21 create a wide face cylindrical finishing tool as indicated at 39. The monofilaments of the tool 39 may be formed by a series of disc or wheel brushes clamped together or by strip brush spirally wrapped on the hub, for example. Such wide face tools are used primarily for finishing, scrubbing and cleaning.

Figure 5:
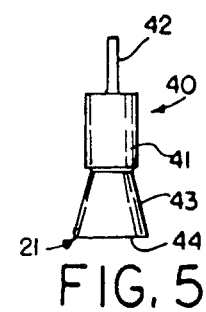
FIG. 5 is a side elevation of an end tool.

In FIG. 5 there is illustrated an end brush type tool 40 which includes a metallic cup-shape hub 41. The cup includes a shank or arbor 42 so that the end brush may be mounted on portable air or electric tools for rotation about its axis. The axially extending group of monofilaments shown at 43 encapsulated in a foamed elastomeric bond extends from the cup-shape hub 41 and may be secured in the cup by suitable special adhesive such as shown in copending application Ser. No. 228,438, filed Aug. 5, 1988, entitled "Adhesive Bonded Flexible Abrasive Finishing Tool", or by other retaining means. The monofilaments and foamed elastomeric bond form a circular end face 44. Such tools are commonly used for spot facing and normally higher speeds are required for effective stock removal action.

Figure 6:
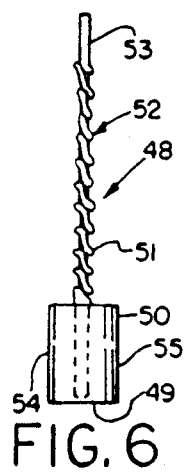
FIG. 6 is a similar elevation of a tube or side action tool.

In FIG. 6 there is illustrated a side action or tube brush type tool 48. The side action tool illustrated includes a group of crimped monofilaments seen at 49 encapsulated in a foamed elastomeric bond 21. The monofilaments extend generally parallel to each other and transverse the axis of the tool with the group of monofilaments being held by and retained by bent U-shape wire 50 which is then twisted upon itself as indicated at 51 to form the stem 52 with the plain end 53 being mounted in a power-driven tool. The monofilaments and bond thus provide two oppositely extending working faces 54 and 55 which are parallel to the axis of the tool. Such tools provide a hard-working side-action and are especially suitable for cleaning or treating drilled holes and tubes where space limitation is a factor. Such tools may be adapted to power machining such as drill presses, lathes, bench grinders, special equipment, as well as portable tools.

Figure 7:
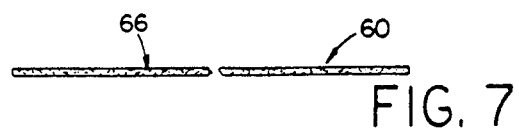
FIG. 7 is an enlarged fragmentary view of a straight monofilament with abrasive embedded throughout.
Figure 8:
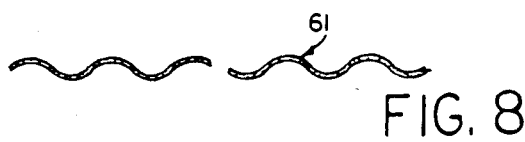
FIG. 8 is a similar view of a crimped monofilament.
Figure 9:
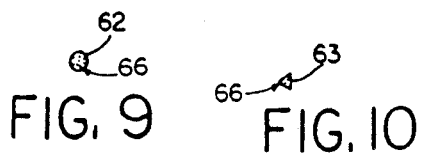
FIGS. 9-12 are transverse sections illustrating various sectional configurations of the monofilament.
Figure 10:
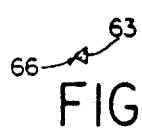
Figure 11:
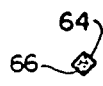
Figure 12:

Referring now to FIG. 7 it will be seen that the monofilament shown at 60, containing abrasive grit 66, used with the tool of the present invention may be straight or uncrimped. As seen in FIG. 8, the monofilament may be crimped as shown at 61. Also, as seen in FIGS. 9, 10, 11 and 12, the monofilament may vary in transverse sectional shape. In FIG. 9 there is illustrated a round monofilament 62. In FIG. 10 there is illustrated a triangular monofilament 63. In FIG. 11 there is illustrated a diamond or somewhat square monofilament 64 while in FIG. 12 there is illustrated a rectangular monofilament 65. Other cross-sectional shapes may of course be employed and also other crimping variations may be utilized. The polygon shapes seen in FIGS. 10, 11 and 12 permit the monofilaments to be packed more tightly, and with the rectangular monofilament of FIG. 12, to contain a higher amount of abrasive grit.

The size of the monofilament may also vary and as a size range for the straight circular in section monofilament the following are preferred:

500 denier: 0.0085 inch diameter
800 denier: 0.0130 inch diameter
1200 denier: 0.0160 inch diameter
2000 denier: 0.0180 inch diameter
3000 denier: 0.0210 inch diameter
4000 denier: 0.0310 inch diameter It will of course be appreciated that other deniers or diameters than those listed in the range above may be employed in certain brushing or abrading applications. The rectangular monofilament, for example, may be on the order of about 0.045 inches thick and about 0.090 inches wide. A preferred material for the abrasive grit containing monofilament is nylon, and the rectangular form may contain about forty percent (40%) abrasive.

In a second embodiment of the present invention, a rotary finishing tool is composed of an elastomeric bond containing a medium abrasive grit and a fine abrasive grit. The elastomeric bond is a foamed elastomeric bond which has greater than 5% voids. The foamed elastomeric bond contains (i) a medium abrasive grit which has a grain size from about 30 to about 50. The fine abrasive grit (ii) has a grain size from about 70 to about 100. Preferably the medium abrasive grain is of a size from about 32 to about 40 and the fine abrasive grain is at a size from about 75 to about 85. The rotary finishing tool contains from about 10 to about 30 parts of (i) and from about 30 to about 60 parts of (ii). Preferably, (i) is present from about 15 to about 25 parts and (ii) is present from about 40 to about 50 parts. It has been found that the combination of the foamed elastomeric bond with the combination of grit allows for increased flexibility, provides for chip clearance and prevents loading of the tool.

The Elastomeric Bond

Elastomeric bonds of the present invention are utilized to hold abrasive grit particles as well as encapsulate the abrasive monofilaments of the present invention. The elastomeric bond is a foamed polymer which is characterized as having greater than 5% voids. Preferably, the bond has from about 10 to about 50% voids. The most preferred amount of voids is about 25%. The cell size of the foamed elastomeric bond is from about 0.01 to about 0.05 inches, with from 0.01 to 0.03 inches being preferred and with 0.015 to 0.025 inches being most preferred. The cellular structure of the foamed elastomeric bond is characterized as having a tensile strength of at least 15%. Preferably the tensile strength is from about 20 to about 30% with from about 20 to about 25% being most preferred. The relatively low tensile strength allows the tool to have mild abrading properties as well as having a beneficial scratch pattern. Elastomeric bonds useful in the present invention are foamed polyurethanes and polyepoxies.

A preferred class of adhesive elastomer bond embraces the polyurethanes, many of which are presently commercially available as two package liquids which are co-blended just before use and have a pot-life of several hours before converting from liquids to solids at usual ambient temperatures.

The art is replete on the chemistry of polyurethane precursor components, but in general it is known to use from about 0.9 to in excess of 1.5 equivalents of selected diisocyanate with one equivalent of a dihydroxy terminated polyester or polyether whose molecular weight is above about 500 to 4000. It is common to use stoichiometric excesses of the diisocyanate component to provide required curing. In this invention, it is preferred to react 1.05 equivalents of selected diisocyanate with one equivalent of a dihydroxy terminated polyester or polyether. Trifunctional components, except for small control amounts are to be avoided. Plasticizers, including octyl alcohol terminated polypropylene adipates of 2000 to 5000 molecular weight from 2 to 20% have been used to soften polyurethanes and may be used in some instances with advantage. Small quantities of epoxides such as the monomeric diglycidyl ether of bisphenol "A" have also been incorporated in polyurethanes to increase their temperature resistance.

The polyepoxides useful in the present invention are epoxy resins which are characterized by the presence of an epoxide group. The polyepoxide resins are then cured to form thermoset resins by anhydrides, amines, polyamines, Lewis acids, and the like. A widely used epoxy resin is a diglycidyl ether of bisphenol "A". This epoxy resin may be cured to form the elastomeric bond of the present invention. A useful epoxy resin is a two part epoxy casting component, part A of which is a fairly low molecular weight epoxy material (sold as Epocast* X-87457-A) containing a flexibility component is mixed 100 parts with 10 parts of a yellow hardener (EPOCAST 'X-8745-B) which is believed to be principally an organic epoxide. When mixed the liquid mixture has a pot life of about 20 minutes and will cure in 24 hours at 75° F. or can be heated at 150° F. to accelerate curing. (*Products of Furane Plastics Co. of Hillburn, N.J.)

Grit

The nature of the grit used in the present invention is not especially critical, provided the grit is of the size as defined herein. Examples of grit include carborundum, emery, garnet, pumice, silicon carbide, aluminum oxide, zirconium alumina, boron nitride, synthetic diamond, tungsten carbide, metallic abrasives, and the like. The grit of the present invention is present at from about 30 to about 80% weight of the elastomeric bond plus the grit. In other words from about 30 to about 80 parts of abrasive grit and from about 20 to about 70 parts of the foamed elastomeric bond are used in the present invention. Preferably the abrasive grit is present at from about 50% to about 70%, with about 65% being most preferred.

When the rotary finishing tool is composed of the elastomeric bond and a combination of grit, the medium abrasive grit (i) has a grain size from about 30 to about 50. The fine abrasive grain (ii) has a grain size of about 70 to about 100. (i) preferably has a grain size of about 32 to about 40 and (ii) has a grain size of about 75 to about 80. Most preferably, (i) has a grain size of about 36 and (ii) has a grain size of about 80.

When the rotary finishing tool contains the foamed elastomeric bond and abrasive monofilaments, the choice of grit size for inclusion in the elastomeric bond is determined by the application for the tools. More specifically, the grit incorporated into a foamed elastomeric bond has a grit size of from about 30 to about 100. More preferably the grit size is from 30 to about 60 with most preferred being from 32 to 40. In a second embodiment, the tool with the abrasive monofilament has a foamed elastomeric bond which contains two abrasive grits; a medium abrasive grit (i) and a fine abrasive grit (ii). When the combination of grit is present, the size of the grit of (i) is from about 30 to about 50 and the size of (ii) is from about 70 to about 100. Preferably (i) has a grain size of about 32 to about 40 and (ii) has a grain size of about 75 to about 85. Most preferably (i) has a grain size of about 36 and (ii) has a grain size of about 80.

Abrasive Monofilament

The abrasive monofilaments useful in the present invention are polymeric materials which contain abrasive grains dispersed uniformly throughout. These polymeric materials may be composed of a nylon, an aramid or a polyester. As indicated, for abrasive containing monofilaments nylon is preferred.

Nylon is a polyamid which is formed by the condensation of bifunctional monomers. Commonly the polymers are formed by the condensation of diamines with dibasic compounds. Examples of nylons useful in the present invention include polyhexamethylene adipamide, nylon-6/6; poly(epsilon caprolactam), nylon-6; polypropiolactam, nylon-3; poly(pyrrolidin-2-one), nylon-4; poly(enanthamide), nylon-7; polycapryllactam, nylon-8; poly(pelargonamide), nylon-9; poly aminodecanoic acid, nylon-10; poly undecaneamide, nylon-11; and poly(hexamethylene dodecandiamide), nylon-6/12.

In general terms, aramids are formed by reacting aromatic diamines and aromatic diacid chlorides in an acceptable solvent and then "spinning" or drawing the reacted aramid polymer fiber from the solvent. Examples of aramid fibers useful in the present invention are NOMEX ® type; KEVLAR ® type and Teijin HM-50 ™ type polymers. NOMEX ® type polymer is a poly(m-phenyleneisophthalamide). The KEVLAR ® type of polymer is a poly(p-phenyleneterephthalamide). The Teijin HM-50 ™ type of polymer is A poly-para-phenylene/3,4'-diphenylether terephthalamide.

Fiber properties may be modified by altering the positions of the substituent groups on the aromatic ring, by adding further substituents to the aromatic ring, by altering the composition of the solvent bath, or by altering the conditions under which the polymer is spun into a fiber. In general, it is predictable that the polymers resulting from reactions of aromatic diamines and aromatic diacids having para-substituted aromatic rings, such as KEVLAR type polymers, result in a more rod-like and stiffer fiber. Reaction of aromatic diamines and aromatic diacids having metasubstituted aromatic rings tends to yield a polymer which forms a more flexible fiber such as NOMEX.

For the present invention monofilaments formed from an aromatic polyamide polymer or aramid containing para-substituted aromatic rings are preferred. These include the above noted KEVLAR type or the Teijin Limited HM-50. Further discussion of aramid fibers may be found in the *Kirk-Othmer Concise Encyclopedia of Chemical Technology*, abridged version of 24 volume Encyclopedia of Chemical Technology, 3rd Ed. (ISBN O-471-86977-S) incorporated herein by reference for its teachings of aramid fibers.

Polyesters are characterized by many ester linkages distributed along the polymer backbone. These polyesters useful in the present invention include but are not limited to polybutylene terephthalate, polyethylene terephthalate, poly(1,4-cyclohexalenedimethyleneterephthalate-coisophthalate) and the like.

The abrasive monofilaments of the present invention are prepared by incorporating into the above polymeric materials (nylon, aramid and polyester) an abrasive grit. The common means of incorporation is by the use of mixing the abrasive grit with the polymeric material and extruding the mixture to form the abrasive monofilaments of the present invention.

When the rotary finishing tool of the present invention contains abrasive monofilaments, the tool is prepared by arranging the array of monofilaments in a mold, introducing into the mold a binder mixture containing the abrasive grit and prepolymeric materials. By prepolymeric materials, it is meant to refer to those materials which upon curing will form the foamed elastomeric bond of the present invention. The binder mixture is cured and foamed to form the foamed elastomeric bonds of the present invention. The curing of the binder mixture occurs over about 0.25 to about 1.5 hours, with about 0.5 hours preferred. The cured binder mixture is then "baked" for about 0.25 to about 1.5 hours at from 75° F. to about 300° F., with about 100° F. to 200° F. preferred and with about 125° F. to 175° F. most preferred. The time of baking is preferably about 0.5 hours. When the curing of the binder mixtures occurs in the presence of moisture, foaming occurs. It is well known that polyurethane polymer precursors will foam with the presence of any moisture. Foaming occurs within 1 to 3 minutes of mixing the prepolymeric materials. By controlling the amount of moisture the desired degree of foaming may be obtained. Amounts of moisture present in the process are from about 0.02% to about 0.03% by weight, with from about 0.023% to about 0.025% by weight preferred. Any blowing agent may be used to accomplish prepared the foamed elastomeric binders of the present invention. For example, air or any non-reaction gas may be employed to achieve the foaming of the binder mixture.

EXAMPLE 1

Add 41.9 parts (731.5 grams, 0.789 equivalents) F112R (polyester resin), 51.03 parts (894.5 grams, 1.75 equivalents) Voranol 2110TB (polyether polyol) and 0.05 parts (0.9 grams) 1,4 BD (glycol) to a reaction vessel. Heat the mixture to 100° F. and add 0.07 parts (0.9 grams) of DBTDL (dibutylin dilau) and 0.13 parts (1.3 grams) R8020 (mixture of triethylenediamine and dimethylethanolamine) and 0.13 parts (2.3 grams) 15344 oil red GPD (anthraquinone). Mix for 15–20 minutes. The mixture is a polyester which should have an equivalent weight of 330.

Add 24.34 parts (78.6 grams, 0.236 equivalents) of the polyester prepared according to the above, 19.60 parts (63.3 grams) of 1A36/CR3 (aluminum oxide, grain size of 36) and 45.7 parts (147.6 grams) of 1A80/CR3 (aluminum oxide, grain size of 80) to a vessel. Add 103 parts (33.4 grams, 0.248 equivalents) P135 (modified 4,4 diphenylmethane diisocyanate). Mix and add mixture to a mold. Foaming occurs within 1 to 3 minutes of mixing the isocyanates with the polyester, depending on catalyst content. Cure the mixture for one-half hour at room temperature. Then bake the mixture for one-half hour at 150° F. The product is the foamed elastomeric bond.

EXAMPLE 2

Prepare a binder mixture as described in Example 1. Add the binder mixture to a mold containing an array of monofilaments which are nylon filaments having silicon carbide abrasive grit, having 80 grain size, dispersed homogeneously throughout the nylon monofilament. Allow the mold to stand for one-half hour at room temperature. Then heat the mold and contents to 150° F. for one-half hour. Release the mold and remove the rotary brush tool.

When the rotary finishing tool of the present invention does not contain abrasive monofilaments, the tool is made by curing the binder mixture as described above.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A rotary finishing tool, comprising:
   (a) a foamed elastomeric bond where the elastomeric bond has greater than 5% voids and contains (i) a medium abrasive grit having a grain size of from about 30 to about 50, and (ii) a fine abrasive grit having a grain size of about 70 to about 100.

2. The tool of claim 1, wherein the elastomeric bond is selected from the group consisting of a polyurethane and a polyepoxide resin.

3. The tool of claim 2, wherein the elastomeric bond is polyurethane resin.

4. The tool of claim 2, wherein the elastomeric bond is a polyepoxide resin.

5. The tool of claim 1, wherein the elastomeric bond has from about 10 to about 50% voids.

6. The tool of claim 5, wherein the elastomeric bond has about 25% voids.

7. The tool of claim 1, wherein the elastomeric bond has a tensile strength of at least 15%.

8. The tool of claim 7, wherein the elastomeric bond has a tensile strength of from about 20 to about 30%.

9. The tool of claim 1, wherein (i) has a grain size of about 32 to about 40 and (ii) has a grain size of from about 75 to about 85.

10. The tool of claim 1, wherein the abrasive wheel contains from about 10 to about 30 parts of (i) and from about 30 to about 60 parts of (ii).

11. The tool of claim 1, further comprising:
    an array of abrasive monofilaments where the abrasive monofilament is a polymeric material which has an abrasive grit dispersed throughout and wherein the elastomeric bond encapsulates the array of monofilaments.

12. The tool of claim 11, wherein the elastomeric bond is selected from the group consisting of a polyurethane and a polyepoxide.

* * * * *